F. M. Leey,

Floating Ships over Sand Bars.

No. 98,356. Patented Dec. 28, 1869.

Witnesses
Arthur Neill
Arthur B. Williams

Inventor
E. Mortimer Leey

United States Patent Office.

EDWARD MORTIMER DEEY, OF NEW YORK, N. Y.

Letters Patent No. 98,356, dated December 28, 1869.

IMPROVED APPARATUS FOR FLOATING SHIPS OVER SAND-BARS.

The Schedule referred to in these Letters Patent and making part of the same.

*To all whom it may concern:*

Be it known that I, EDWARD MORTIMER DEEY, of the city, county, and State of New York, have invented a new and useful Apparatus for Floating Ships and Other Vessels over Sand-Bars, and similar river obstructions, of which the following is a specification.

Being aware that numerous rivers in the United States, near their mouths of discharge into the ocean, as well as at other points, are rendered unnavigable because of the accumulation of sand and other drifting deposits becoming consolidated, so as to form what is commonly called a bar, the presence of which prevents the passage of ships from the ocean to their destination on the river, at low tide, and often at high tide, causing much delay and consequent expense in discharging and redischarging cargo; these facts suggested to me the construction of my apparatus, which consists of a combination of locks, canal and reservoir, for the purpose of floating ships over sand-bars at high and low tides, as I will further explain by reference to the drawings, in which—

Figure 1:
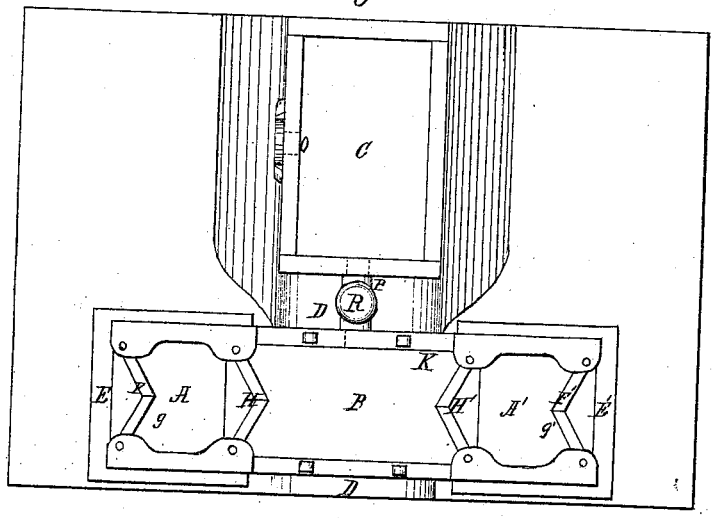
Figure 2:
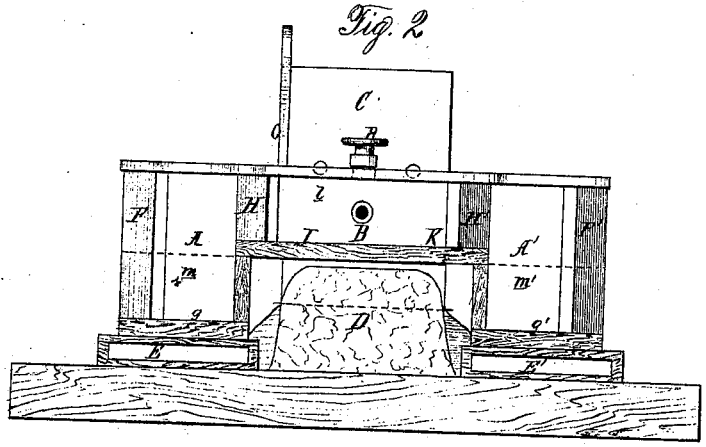

Figure 1 is a top view of my apparatus;

Figure 2, a longitudinal section through locks and canal; and

Figure 3:
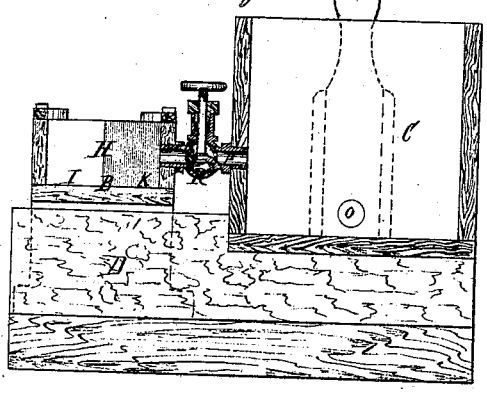

Figure 3, a transverse section through canal and reservoir.

In said drawings—

A A' indicate the locks;

B, the canal; and

C, the reservoir.

D is the sand-bar.

The locks A A' are similar, their bases E E' being floats or air-vessels, said locks being provided with outer gates F F', which extend downward to the floors $g$ $g'$ of the locks and inner gates H H', which extend to the floor I of the canal K.

This canal K extends over and rests on the locks, and form a portion of the walls of the locks, the canal and locks forming three section, $l$ $m$ $m'$, (see fig. 2,) for purposes hereinafter explained.

C is the reservoir, provided with one or more sluices, O, for receiving the water at high tide, and retaining the same until required for filling or supplying the deficiency of water in the locks and canal, said reservoir being united to the canal by any proper means, and by a pipe, P, having a gate, R, for supplying the latter with water.

The capacity of the reservoir may be sufficient to supply the locks and canal with any amount of water necessary to the purposes indicated, and may, in addition to the high tide, be supplied with water by means of steam-pumps.

Preparatory to floating a ship over the bar D, the outer gate F is opened, and the ship permitted to float into the lock A. This gate F is now closed, and the inner gates H H' are opened, and the locks A A' and canal B filled with water from the reservoir C.

The ship is now raised and floated from the lock A, through the canal B, and into the lock A'. The inner gates H H' are now closed, retaining the water in the lock A and canal B for future use, and next, by a partial opening the gate F', or by means of a sluice in said gate, the water is allowed to escape, until the ship falls to the level of the water in the river above the bar, when the gate is entirely open, and the ship allowed to pursue her course.

The air-vessels E E' may be filled with water, for the purpose of sinking the locks and canal, to receive the ship, in which case the pipe O may be flexible, after which the water may be pumped out of the floats, to aid in buoying up the structure, or the whole combination may be made stationary, by chains and anchors, or other proper means; and for the purpose of moving the apparatus from one bar to another, the combination may be taken apart in sections $l$ $m$ $m'$ and C, and floated to the desired point.

I claim, as my invention—

The apparatus herein described, consisting of the locks A A', provided with floats E E', canal B, and reservoir C, combined, arranged, and operating substantially as and for the purposes described and set forth.

In testimony whereof I have hereunto set my signature, this 19th day of November, A. D. 1869.

E. MORTIMER DEEY.

Witnesses:
ARTHUR NEILL,
ARTHUR B. WILLIAMS.